US011080822B2

(12) United States Patent
Lin et al.

(10) Patent No.: US 11,080,822 B2
(45) Date of Patent: Aug. 3, 2021

(54) METHOD, SYSTEM AND RECORDING MEDIUM FOR BUILDING ENVIRONMENT MAP

(71) Applicant: HTC Corporation, Taoyuan (TW)

(72) Inventors: Yi-Chen Lin, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/706,850

(22) Filed: Dec. 9, 2019

(65) Prior Publication Data

US 2020/0202491 A1 Jun. 25, 2020

Related U.S. Application Data

(60) Provisional application No. 62/783,205, filed on Dec. 21, 2018.

(51) Int. Cl.
*G06T 3/40* (2006.01)
*G06T 19/00* (2011.01)

(52) U.S. Cl.
CPC .......... *G06T 3/4038* (2013.01); *G06T 19/006* (2013.01)

(58) Field of Classification Search
CPC ........... H04N 5/23238; H04N 5/23293; H04N 5/232945
See application file for complete search history.

(56) References Cited

U.S. PATENT DOCUMENTS

| 9,185,391 | B1 * | 11/2015 | Prechtl | H04N 5/2251 |
| 9,241,104 | B1 * | 1/2016 | Liao | H04N 5/232945 |
| 9,516,225 | B2 * | 12/2016 | Banta | H04N 5/23238 |
| 9,781,341 | B2 * | 10/2017 | Shinozaki | H04N 5/23238 |
| 9,838,600 | B1 * | 12/2017 | Tam | H04N 5/2258 |
| 2016/0246061 | A1 | 8/2016 | Bickerstaff et al. | |
| 2018/0181196 | A1 | 6/2018 | Lee et al. | |

OTHER PUBLICATIONS

Office Action of Taiwan Counterpart Application, dated Mar. 25, 2021, pp. 1-8.

* cited by examiner

*Primary Examiner* — Ming Wu
(74) *Attorney, Agent, or Firm* — JCIPRNET

(57) ABSTRACT

A method, a system and a recording medium for building environment map are provided. In the method, a plurality of captured images are captured by using a head-mounted display (HMD). Then, a viewing direction and a translation direction of the HMD are calculated, and an importance map corresponding to the captured images is determined according to the viewing direction and the translation direction of the HMD. Finally, the captured images are stitched to generate a panoramic image according to the importance map.

18 Claims, 15 Drawing Sheets

METHOD, SYSTEM AND RECORDING MEDIUM FOR BUILDING ENVIRONMENT MAP

CROSS-REFERENCE TO RELATED APPLICATION

This application claims the priority benefit of U.S. provisional application No. 62/783,205, filed on Dec. 21, 2018. The entirety of the above-mentioned patent application is hereby incorporated by reference herein and made a part of this specification.

TECHNICAL FIELD

The invention relates to a mixed reality technology, and more particularly, to a method, a system and a recording medium for building environment map.

BACKGROUND

Mixed Reality (MR) is a technology that uses computer simulation technology to combine the real world and the virtual world to create a mixed world in three dimensional space. A virtual screen displayed on the head-mounted display worn by a user allows the user to simultaneously view a physical object of the real world coexisting together with a digital virtual object as a mixed environment that is mainly visual and combines the perceptions of hearing and touching. The user can experience the mixed reality like the real world and can interact with the virtual object in the mixed environment.

In order to render the virtual object that matches with the real world, it is necessary to create lighting data of the real world before the mixed environment can be built. In a conventional building process, a mixed reality device executes a building tool before the user has access to application content, and requires the user to align a camera or a calibrator of a head-mounted display with a set of matching points to create the lighting data. However, such a building process is time consuming, and the user may often encounter difficulties in aligning with the matching points when operating the head-mounted display.

SUMMARY

The invention provides a method, a system and a recording medium for building environment map, which can generate an environment map in real time and online.

The invention provides a method for building environment map, and the method includes the following steps. A plurality of captured images are captured by a head-mounted display. A viewing direction and a translation direction of the head-mounted display are calculated. An importance map corresponding to the captured images is determined according to the viewing direction and the translation direction of the head-mounted display. The captured images are stitched to generate a panoramic image according to the importance map.

In an embodiment of the invention, the step of calculating the viewing direction and the translation direction of the head-mounted display includes: analyzing image content in the captured images to detect the viewing direction and the translation direction of the head-mounted display.

In an embodiment of the invention, the step of calculating the viewing direction and the translation direction of the head-mounted display includes: detecting the viewing direction of the head-mounted display worn by a user by a motion sensor, and locating the translation direction of the head-mounted display worn by the user by a locater.

In an embodiment of the invention, the step of determining the importance map corresponding to the captured images according to the viewing direction and the translation direction of the head-mounted display includes: determining importance parameters corresponding to each of pixels in the captured images according to the viewing direction and the translation direction, creating importance frames corresponding to each of the captured images according to the importance parameters, and integrating the importance frames to generate the importance map.

In an embodiment of the invention, the step of stitching the captured images to generate the panoramic image according to the importance map includes: stitching the captured images to generate the panoramic image according to resolutions corresponding to the importance parameters in the importance frames.

In an embodiment of the invention, the method for building environment map further includes the following step: ending an image stitching procedure when a proportion of the importance parameters set in the importance map is greater than a preset proportion threshold.

In an embodiment of the invention, the method for building environment map further includes the following step: capturing a translation distance of the head-mounted display, and determining the importance map corresponding to the captured images according to the viewing direction, the translation direction and the translation distance of the head-mounted display.

In an embodiment of the invention, the method for building environment map further includes the following step: recording a stitched region and an unstitched region corresponding to the panoramic image when stitching the captured images, diffusing the panorama image according to the stitched region and the unstitched region and generating an environment map.

In an embodiment of the invention, the step of diffusing the panorama image according to the stitched region and the unstitched region and generating the environment map further includes: when a pixel position for diffusing exceeds a boundary of the panoramic image, mapping the pixel position to fetch a corresponding fetched pixel, and diffusing the panoramic image according to the fetched pixel.

A mixed reality system of the invention includes a head-mounted display, a storage device and a calculating device. The storage device stores one or more commands. The calculating device is connected to the head-mounted display and the storage device, and configured to execute the one or more commands to: capture a plurality of captured images by the head-mounted display; calculate a viewing direction and a translation direction of the head-mounted display; determine an importance map corresponding to the captured images according to the viewing direction and the translation direction of the head-mounted display; and stitch the captured images to generate a panoramic image according to the importance map.

The invention further provides a non-transitory computer-readable recording medium configured to record programs. Here, the programs are loaded in by a processor in a calculating device to execute steps of: capturing a plurality of captured images by a head-mounted display; and calculating a viewing direction and a translation direction of the head-mounted display. The calculating device determines an importance map corresponding to the captured images according to the viewing direction and the translation direction of the head-mounted display. The calculating device stitches the captured images to generate a panoramic image according to the importance map.

To make the aforementioned more comprehensible, several embodiments accompanied with drawings are described in detail as follows.

DESCRIPTION OF THE EMBODIMENTS

Figure 1:
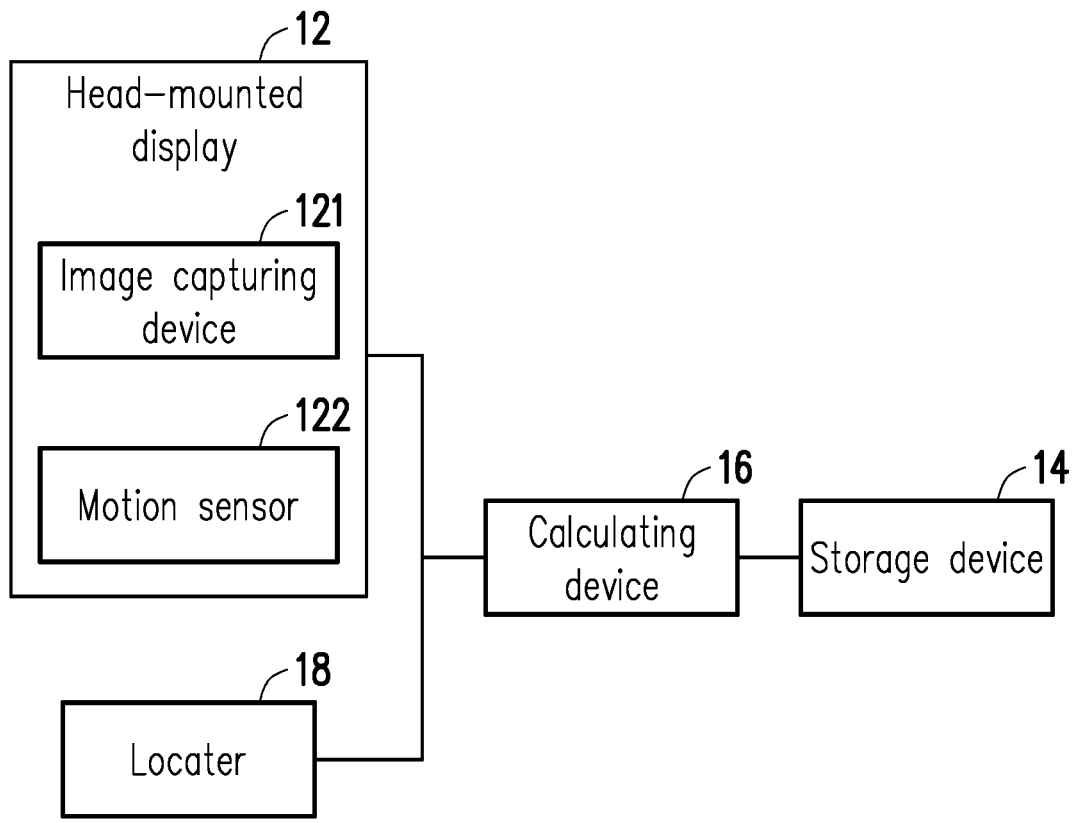
FIG. 1 is a block diagram illustrating a mixed reality system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

In the invention, an importance map corresponding to captured images is created according to a viewing direction and a translation direction of a head-mounted display, and the captured images are stitched to generate an environment map according to the importance map. In this way, the environment map can be generated at online stage to reduce the time required before the user can access a mixed reality application and achieve the purpose of building the environment map in real time.

FIG. 1 is a block diagram illustrating a mixed reality system according to an embodiment of the invention. Referring to FIG. 1, a mixed reality system 10 of the present embodiment includes a head-mounted display 12, a storage device 14, and a calculating device 16, and functions of these devices are described as follows.

The head-mounted display 12 is, for example, a liquid-crystal display (LCD), a light-emitting diode (LED) display or other suitable type of display, and is manufactured in form of a helmet or glasses that can be worn by the user on the head. The head-mounted display 12 is additionally disposed with an image capturing device 121 and a motion sensor 122 (e.g., a gravity sensor, a gyro or the like). The image capturing device 121 may be any camera having a charge coupled device (CCD) lens, a complementary metal oxide semiconductor transistors (CMOS) lens or an infrared lens, but the invention is not limit thereto. The image capturing device 121 may be one or more and disposed on the head-mounted display 12 (e.g., disposed in front of line of sight of the user wearing the head-mounted display 12 to capture images in front of the user's line of sight). The motion sensor 122 can detect a rotation or tilt angle of the user's head and can feed sensed data back to the calculating device 16 so the calculating device 16 can calculate the viewing direction and the translation direction of the user's head.

The storage device 14 may be a fixed or a movable device in any possible forms including a random access memory (RAM), a read-only memory (ROM), a flash memory or other similar elements, or a combination of the above-mentioned elements. In this embodiment, the storage device 14 is configured to store data and programs that can be executed by the calculating device 16, and the programs include one or more commands.

The calculating device 16 is, for example, a computer device having computing capability in which a processor is included, such as a file server, a database server, an application server, a work station or a personal computer. The processor is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The calculating device 16 is connected to the head-mounted display 12 and the storage device 14 to load in the programs from the storage device 14 and accordingly perform the method for building environment map of the invention.

The mixed reality system 10 may be additionally disposed with a locater 18 for locating the user wearing the head-mounted display. The locater 18 is connected to the calculating device 16, and includes a laser or infrared transmitter and receiver that can be used to detect a distance from an object in three dimensional space. The locater 18 can locate a position of the object (e.g., the head-mounted display 12) in three dimensional space in cooperation with a plurality of calibrators disposed on the object. The locater 18 can be placed at the corner of an activity space of the user to not only locate the position of the user in three dimensional space but also define a boundary of the activity space. A position of the boundary may be displayed in the head-mounted display 12 when the user is close to the boundary, so as to prompt the user to avoid walking out of the activity space or colliding with objects located outside of the activity space. The calculating device 16 can be connected to the locater 18 for data transmission in wired or wireless manner.

It should be noted that, in an embodiment, the storage device 14 and the calculating device 16 are separately disposed independently of the head-mounted display 12 and are connected to the head-mounted display 12 for data transmission in wired or wireless manner. In this embodiment, the storage device 14 can be disposed in the calculating device 16. In another embodiment, the storage device 14 and the calculating device 16 may be integrated into the head-mounted display 12 and connected to the head-mounted display 12 through transmission lines to transmit data to each other. However, the invention is not limited in this regard. Detailed steps of the method for building environment map of the invention are described as follows.

Figure 2:
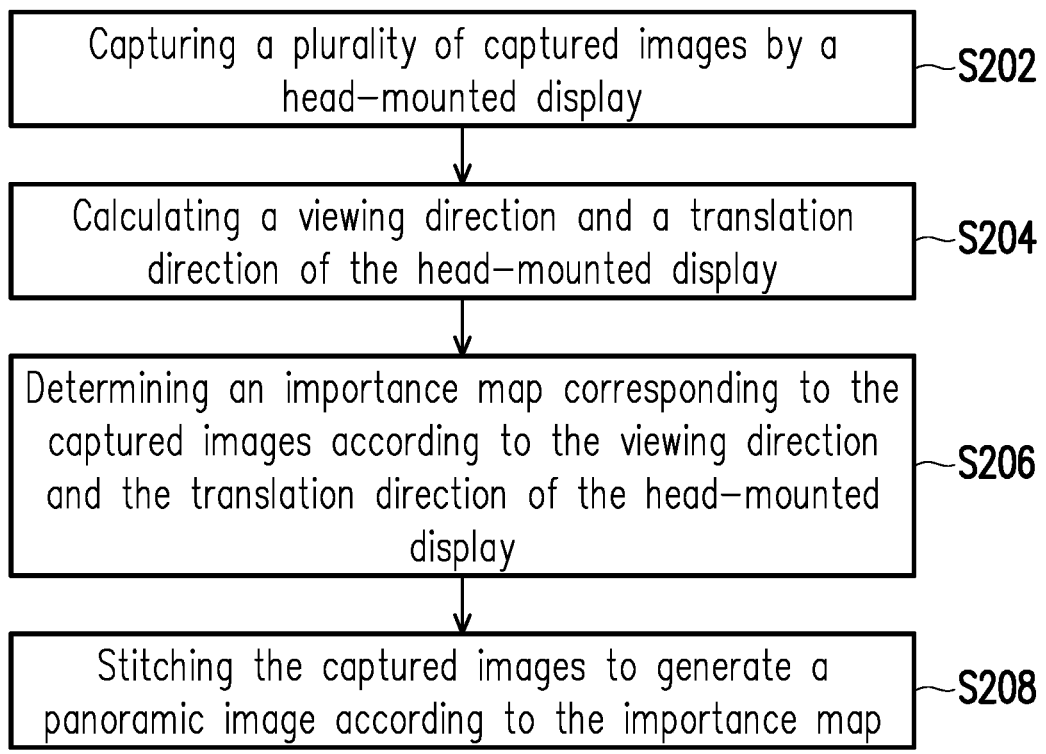
FIG. 2 is a flowchart illustrating a method for building environment map according to an embodiment of the invention.

FIG. 2 is a flowchart illustrating a method for building environment map according to an embodiment of the invention. Referring to FIG. 2, the method of the present embodiment of the invention is adapted to the mixed reality system 10 of FIG. 1. The following detailed steps are elaborated to describe the method for building environment map of the present embodiment with the reference to each element in the mixed reality system 10.

First of all, the calculating device 16 captures a plurality of captured images by the head-mounted display 12 (step S202). In detail, the calculating device 16 controls the image capturing device 121 to capture a real world image in front of the field of view of the head-mounted display 12. Next, the calculating device 16 calculates a viewing direction and a translation direction of the head-mounted display 12 (step S204). In an embodiment, the viewing direction and the translation direction of the head-mounted display 12 may be obtained by calculating the images captured using the image capturing device 121. Here, the calculating device 16 can analyze image content in the captured images to detect the viewing direction and the translation direction of the head-mounted display 12. Specifically, the calculating device 16 can analyze to the image content in the captured images to directly detect a viewing direction and a translation direction of the field of view (FOV) of the image content, which are then set as the viewing direction and the translation view of the head-mounted display 12. For instance, by using an image recognition to analyze displacements and deformations of feature points in the captured images, the calculating device 16 can determine the rotation or tilt angle and a variation in forward and backward movement of the head-mounted display 12, and calculate the viewing direction and the translation direction of the head-mounted display 12 according to the variation.

In another embodiment, the calculating device 16 can detect the viewing direction of the head-mounted display 12 worn by the user by the motion sensor 122, and the calculating device 16 can locate the translation direction of the head-mounted display 12 worn by the user by the locater 18. Specifically, the calculating device 16 can receive the rotation or tilt angle of the head-mounted display 12 sensed by the motion sensor 122, and calculate the viewing direction of the head-mounted display 12 according to the rotation or tilt angle. On the other hand, in the mixed reality system 10, the locater 18 can also be used to detect a translation direction of the user in three dimensional space. The locater 18 is, for example, disposed on two opposite corners in a room, and capable of locating a position of the user wearing the head-mounted display 12 in the room and providing locating information to the calculating device 16. After obtaining the positioning information of the head-mounted display 12, the calculating device 16 can determine the translation direction of the user in the room.

In yet another embodiment, the calculating device 16 can combine use of various positioning technologies described above to obtain the viewing direction and the translation direction of the head-mounted display 12. However, the invention is not limited in this regard.

Then, the calculating device 16 determines an importance map corresponding to the captured images according to the viewing direction and the translation direction of the head-mounted display 12 (step S206). Here, the calculating device 16 determines importance parameters corresponding to each of pixels in the captured images according to the viewing direction and the translation direction, creates importance frames corresponding to each of the captured images according to the importance parameters, and integrates the importance frames to generate the importance map. Specifically, when the viewing direction and the translation direction of the head-mounted display 12 are closer to each other, as a translation error between the new captured image and the captured image at a starting position is smaller, the importance of the new captured image with respect to the starting position is higher. On the other hand, when the viewing direction and the translation direction of the head-mounted display 12 are farther from each other, as the translation error between the new captured image and the captured image at the starting position is larger, the importance of the new captured image with respect to the starting position is lower. The calculating device 16 records the importance of the captured image by, for example, setting the importance parameters of the pixels with the highest importance as 1 and setting the importance parameters of the pixels with the lowest importance as 1 in the importance frame corresponding to the captured image, and the importance parameters corresponding to each pixel can be within a range of 0 to 1.

Figure 3:
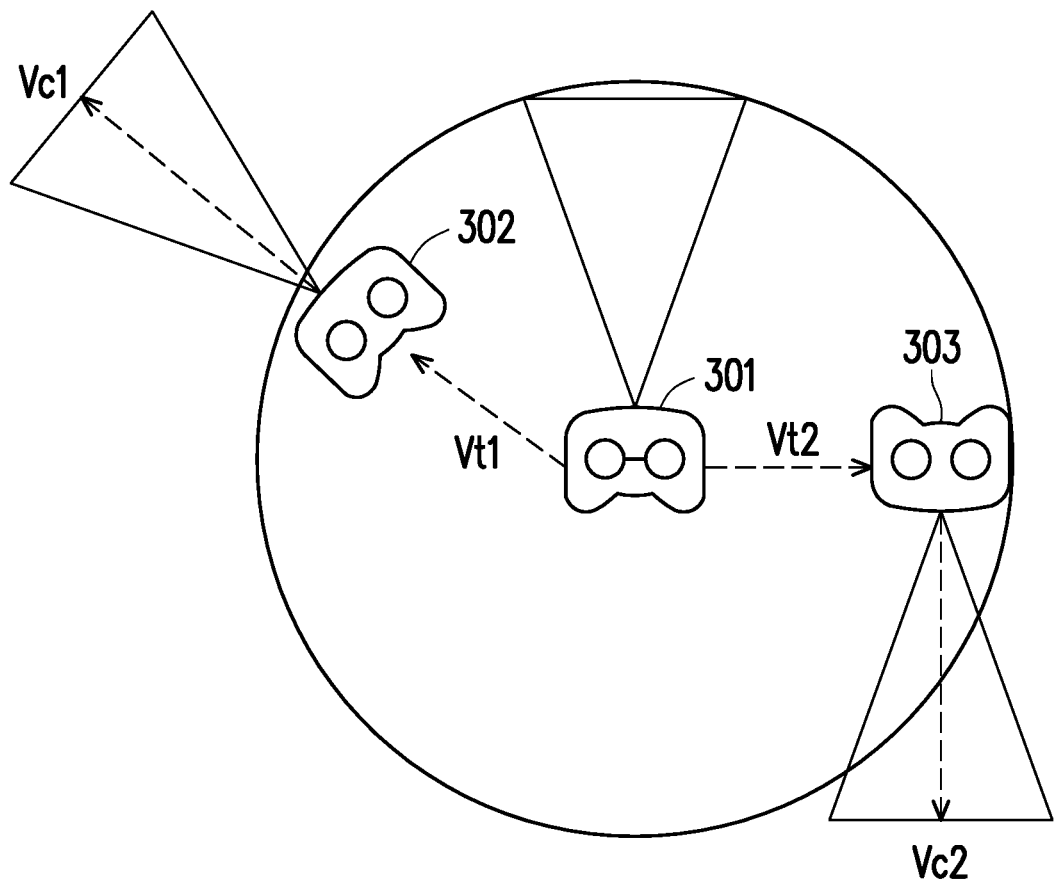
FIG. 3 is a schematic diagram illustrating a viewing direction and a translation direction according to an embodiment of the invention.

In detail, FIG. 3 is a schematic diagram illustrating a viewing direction and a translation direction according to an embodiment of the invention. Referring to FIG. 3, when the head-mounted display 12 translates forward and leftward from a position 301 to a position 302 and a viewing direction Vc1 and a translation direction Vt1 of the head-mounted display 12 also translate forward and leftward, the viewing direction Vc1 and the translation direction Vt1 of the head-mounted display 12 are close to each other in this case. Further, when the head-mounted display 12 translates rightward from the position 301 to a position 303 and yet a viewing direction Vc2 of the head-mounted display 12 turns backward, the viewing direction Vc2 and a translation direction Vt2 are different by approximately 90 degrees when the user moves. In this case, the viewing direction Vc2 and the translation direction Vt2 of the head-mounted display 12 are farther from each other. In other words, if an angle between the translation direction and the viewing direction is greater, the two directions are father from each other, and thus the importance of the captured image with respect to the position 301 is lower.

In another embodiment, in addition to the viewing direction and the translation direction of the head-mounted display 12, the calculating device 16 can further determine the importance of the captured images by taking a translation distance of the head-mounted display 12 into consideration. Specifically, the calculating device 16 captures the translation distance of the head-mounted display 12. Then, the calculating device 16 determines the importance map corresponding to the captured images according to the viewing direction, the translation direction and the translation distance of the head-mounted display 12. When the translation distance of the head-mounted display 12 from the starting position is shorter, as the translation error between the new captured image and the captured image at the starting position is smaller, the importance of the captured image with respect to the starting position is higher. When the translation distance from the starting position is longer, as the translation error between the new captured image and the captured image at the starting position is larger, the importance of the captured image with respect to the starting position is lower. In an embodiment, the captured translation distance of the head-mounted display 12 may be obtained by calculating the images captured using the image capturing device 121. In another embodiment, the locater 18 may be used to detect a translation direction of the image capturing device 121 in the three dimensional space and accordingly calculate a translation distance. The invention does not limit the method for obtaining the translation distance.

Lastly, the calculating device 16 stitches the captured images to generate a panoramic image according to the importance map (step S208). After obtaining the captured images and importance map of the captured image corresponding to the starting position, the calculating device 16 can stitch the captured images to generate the panoramic image according to the importance map. Specifically, the calculating device 16 can stitch the captured images to generate the panoramic image according to resolutions corresponding to the importance parameters in the importance frame. Here, the pixels with the importance parameters closer to 1 in the importance frame corresponding to the captured image are stitched by images with higher resolutions, and the pixels with the importance parameters closer to 0 in the importance frame corresponding to the captured image are stitched by images with lower resolutions. In an embodiment, if the importance parameter is 0, the panoramic image is not updated according to the captured image corresponding to the pixel. On the other hand, if the importance parameter is 1, the panoramic image is updated according an original resolution of the captured image. The resolutions of the images corresponding to each of the importance parameters may be determined in advance by a series of testing and analysis and stored in the storage device 14.

It should be noted that, the viewing direction, the translation direction, the translation distance of the head-mounted display 12 described in the present embodiment may be calculated by using different starting positions as origins. Therefore, each of the captured images will have a different importance in correspondence to the different starting positions, and different importance frames will be generated. Accordingly, different environment maps can be generated for the different starting positions (origins). In this embodiment, an example for generating the panoramic image at the position 301 in FIG. 3 is provided, and how the panoramic image is generated will be described in detail below.

Figure 4A:
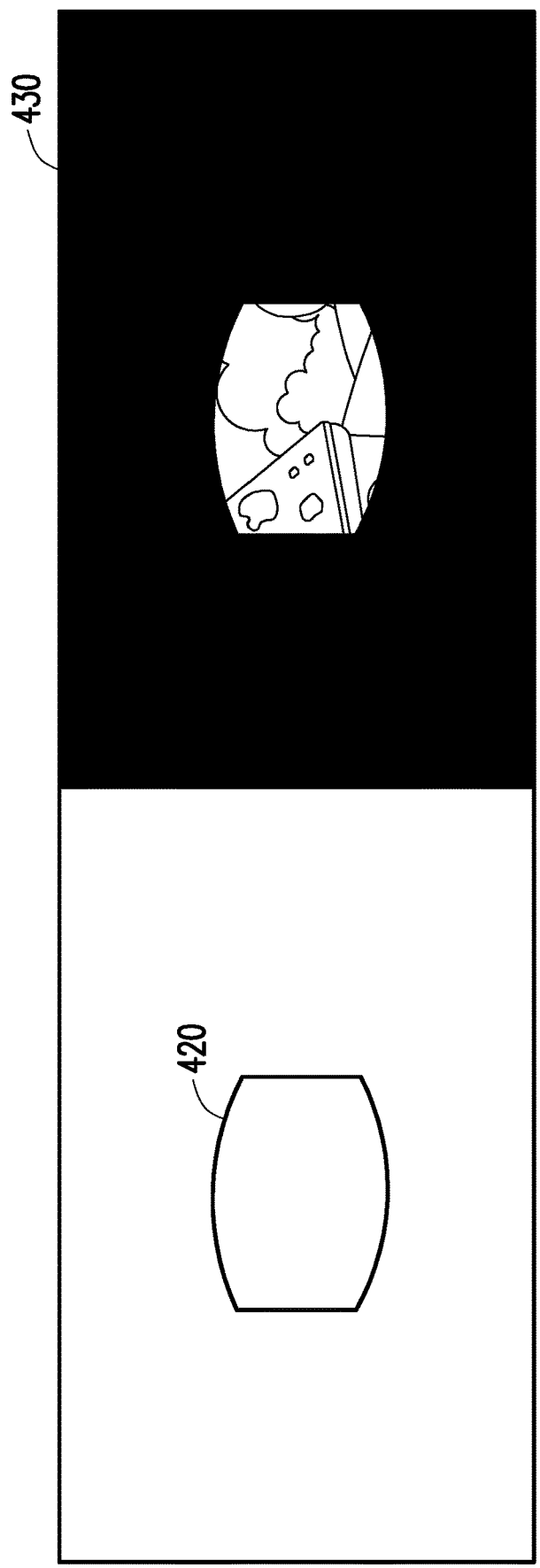
FIG. 4A to FIG. 4D are examples illustrating how a panoramic image is generated according to an embodiment of the invention.

FIG. 4A to FIG. 4D are examples illustrating how a panoramic image is generated according to an embodiment of the invention. Referring to FIG. 3 and FIG. 4A together, with the position 301 as the starting position, the image capturing device 121 captures the real world image at the starting position. Because the head-mounted display 12 does not move, the captured image does not have the translation error. Accordingly, the calculating device 16 can set values of all the pixels in an importance frame 420 as 1, which indicates that each of the pixels is important. At this time, the calculating device 16 can stitch the captured image to generate a panoramic image 430 according the importance frame 420.

Figure 4B:
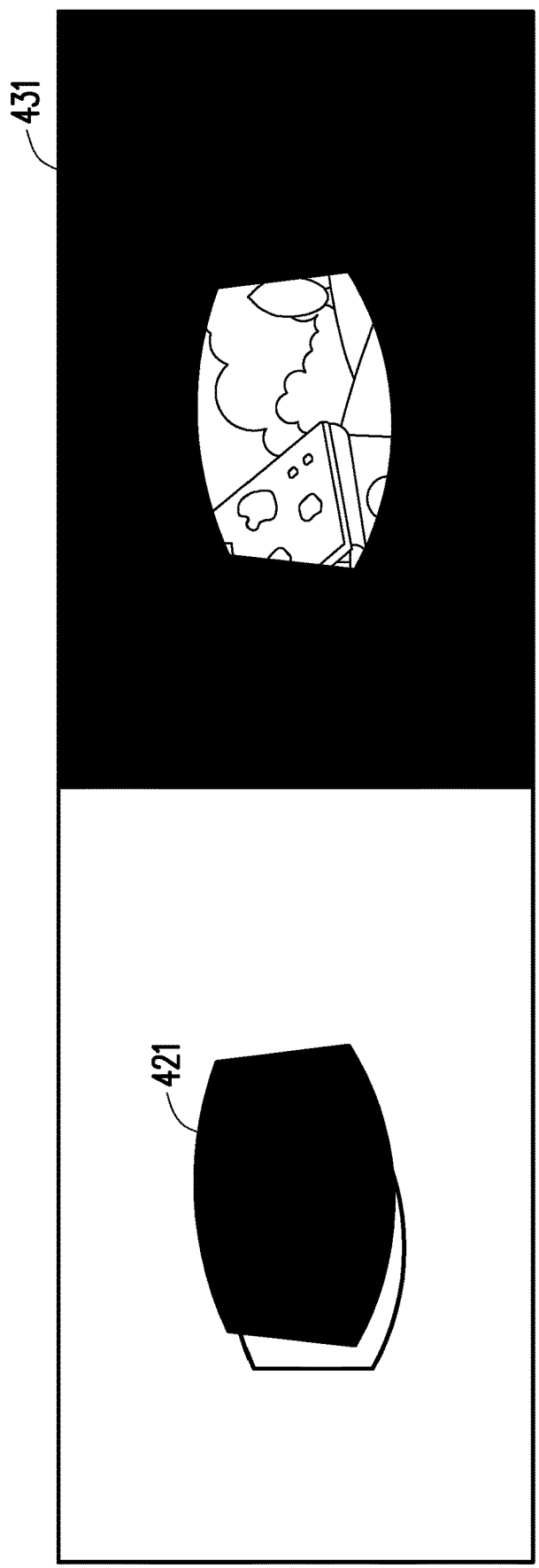

Next, referring to FIG. 3 and FIG. 4B together, at this time, the user moves rightward to the position 303 and looks toward a left side of the translation direction. That is, the viewing direction of the head-mounted display 12 corresponds to a front side of the position 301 and the translation direction corresponds to a right side of the position 301. In other words, the angle between the viewing direction and the translation direction is approximately 90 degrees. In this embodiment, the image capturing device 12 captures the real world image at the position 303. Since the head-mounted display 12 has generated a displacement, the captured image has the translation error. Therefore, the calculating device 16 determines an importance frame 421 corresponding to the captured image according to the difference between the viewing direction and the translation direction. In this embodiment, as the angle between the viewing direction and the translation direction is approximately 90 degrees, the difference between the viewing direction and the translation direction is large, and thus the importance of the captured image is lower at this time. Accordingly, the calculating device 16 can set values of all the pixels in the importance frame 421 as 0, which indicates that each of the pixels is not important. At this time, the calculating device 16 can stitch the captured images to generate a panoramic image 431 according the importance frame 421. Specifically, because the importance parameters of all the pixels in the importance frame 421 corresponding to the captured image are 0, the captured image in this embodiment will not be used to update the panoramic image.

Figure 4C:
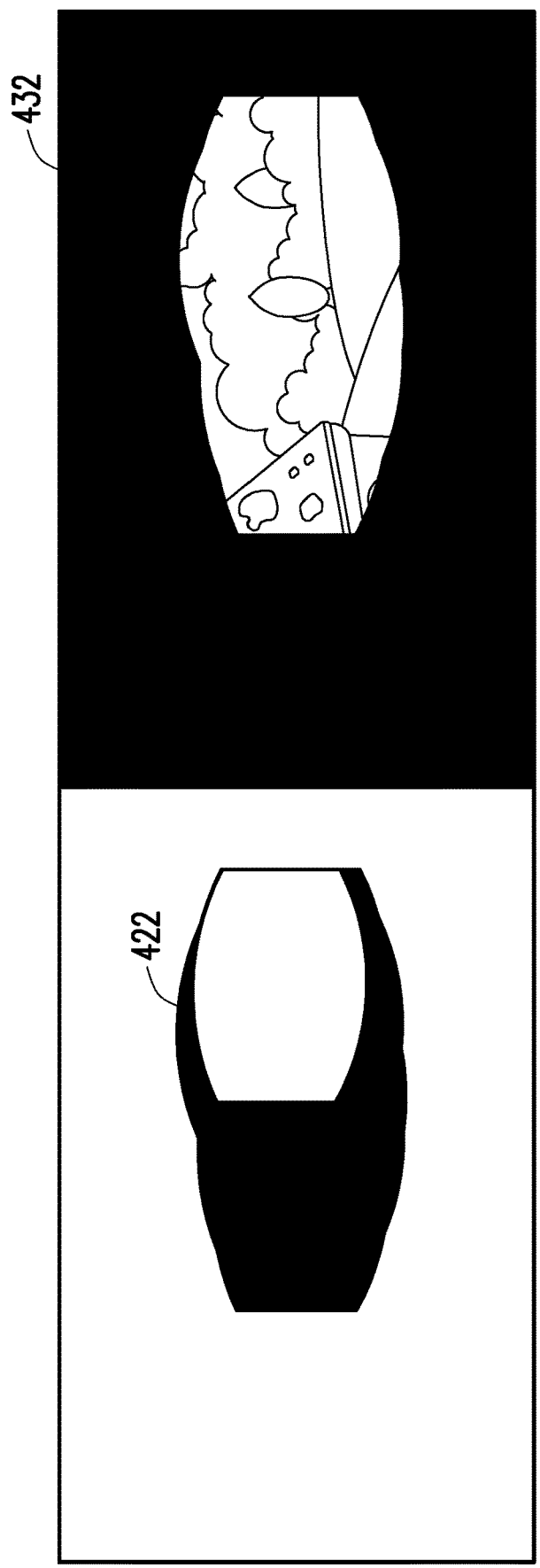

Referring to FIG. 3 and FIG. 4C together, at this time, the user moves rightward to the position 303 and looks toward a front side of the translation direction. That is, the viewing direction and the translation direction of the head-mounted display 12 both correspond to the right side of the position 301. In other words, the angle between the viewing direction and the translation direction is approximately 0 degrees. In this embodiment, the image capturing device 121 captures the real world image at the position 303. Since the head-mounted display 12 has generated a displacement, the captured image has the translation error. Therefore, the calculating device 16 determines an importance frame 422 corresponding to the captured image according to the difference between the viewing direction and the translation direction. In this embodiment, as the angle between the viewing direction and the translation direction is approximately 0 degree, the difference between the viewing direction and the translation direction is small, and thus the importance of the captured image is higher. The calculating device 16 can set the importance parameters of the pixels corresponding to the captured image close to an image center as 1, and gradually decrease the importance parameters of the pixels to 0 starting from the image center to an image edge, so as to generate, for example, the importance frame 422 in FIG. 4C. At this time, the calculating device 16 can stitch the captured images to generate a panoramic image 432 according the importance frame 422. Specifically, according the importance parameters in the importance frame 422 corresponding to the captured image, the calculating device 16 stitches the captured image to the panoramic image with the captured image having a different resolution.

Figure 4D:
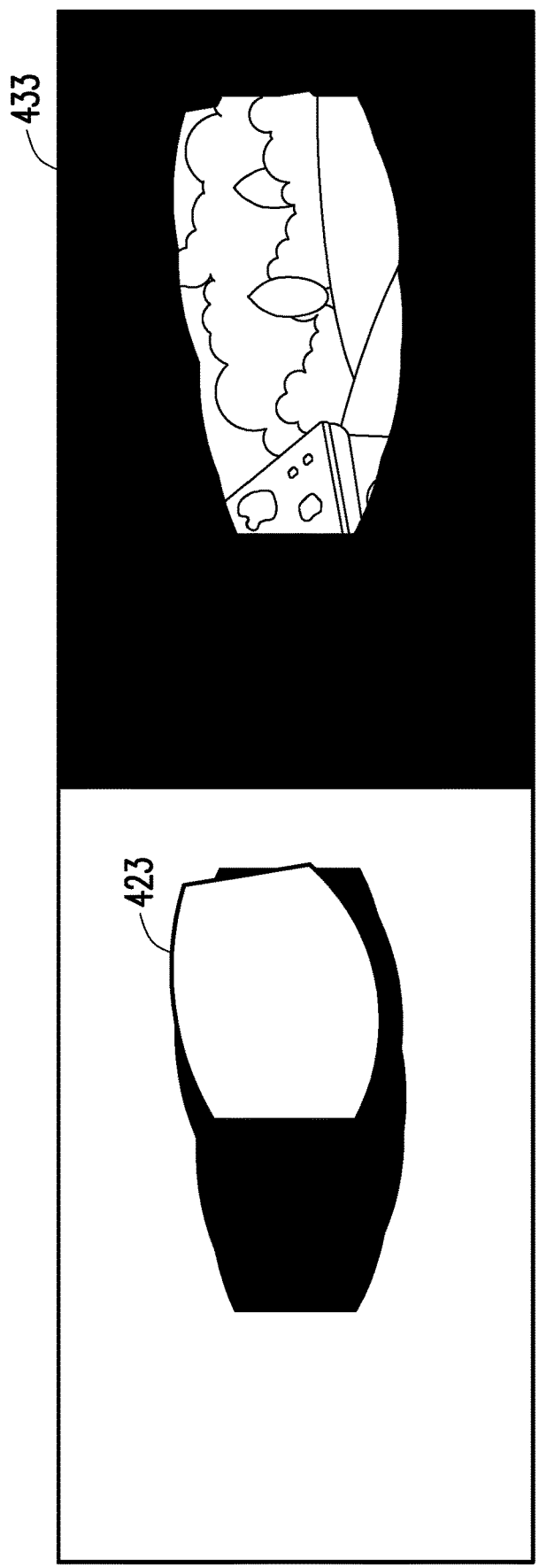

Referring to FIG. 3 and FIG. 4D together, at this time, the user moves rightward to the position 303 and looks toward the front side of the translation direction, and the translation distance of the user is shorter than the translation distance of the user in FIG. 4C. That is, as the viewing direction and the translation direction of the head-mounted display 12 both correspond to the right side of the position 301, the angle between the viewing direction and the translation direction is approximately 0 degree. In this embodiment, the image capturing device 121 captures the real world image at the position 303. The calculating device 16 can set the importance parameters of the pixels corresponding to the captured image close to the image center as 1, and gradually decrease the importance parameters of the pixels to 0 starting from the image center to the image edge, so as to generate, for example, an importance frame 423 in FIG. 4D. However, in comparison with FIG. 4C, as the translation distance of the user in the present embodiment is shorter than that of the user in FIG. 4C, the importance of the captured image is higher at this time. Therefore, in comparison with the importance frame 422, the importance parameters of the pixels corresponding to the captured image in the importance frame 423 are greater than the importance parameters of the pixels corresponding to the captured image in the importance frame 422. At this time, the calculating device 16 can stitch the captured images to generate a panoramic image 433 according an importance frame 423. Specifically, according the importance parameters in the importance frame 423 corresponding to the captured image, the calculating device 16 stitches the captured image to the panoramic image with the captured image having a different resolution.

Figure 5A:
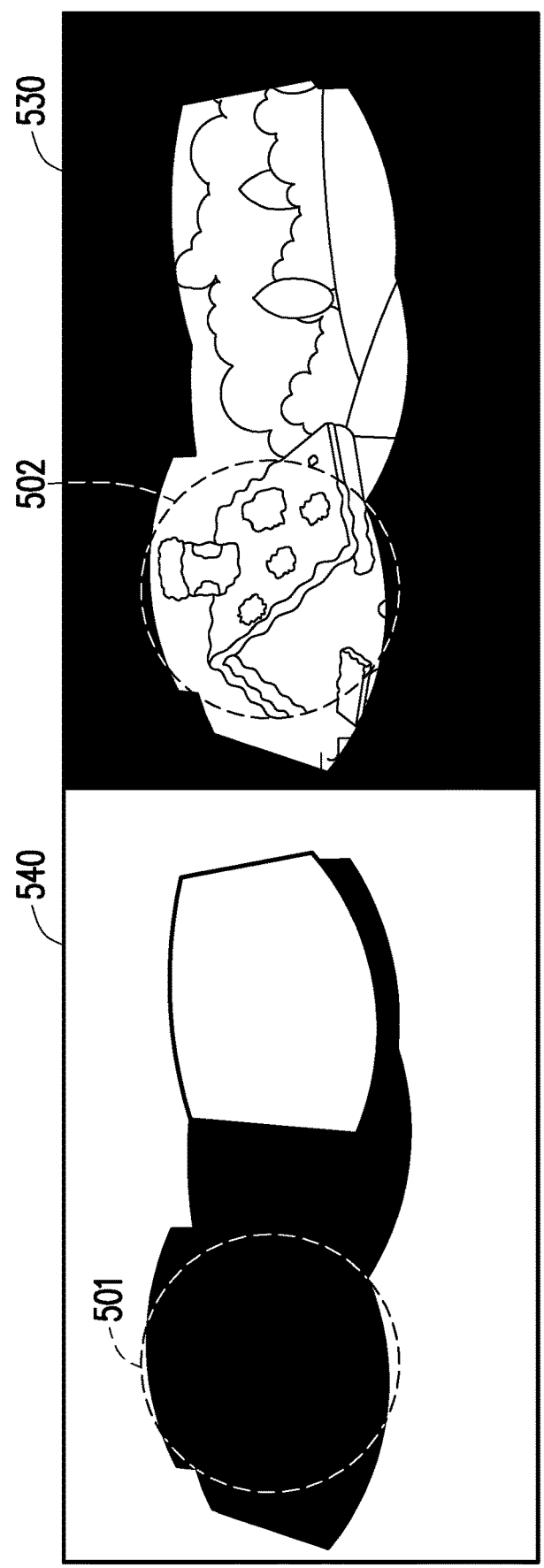
FIG. 5A and FIG. 5B are examples illustrating how a panoramic image is updated according to an embodiment of the invention.
Figure 5B:
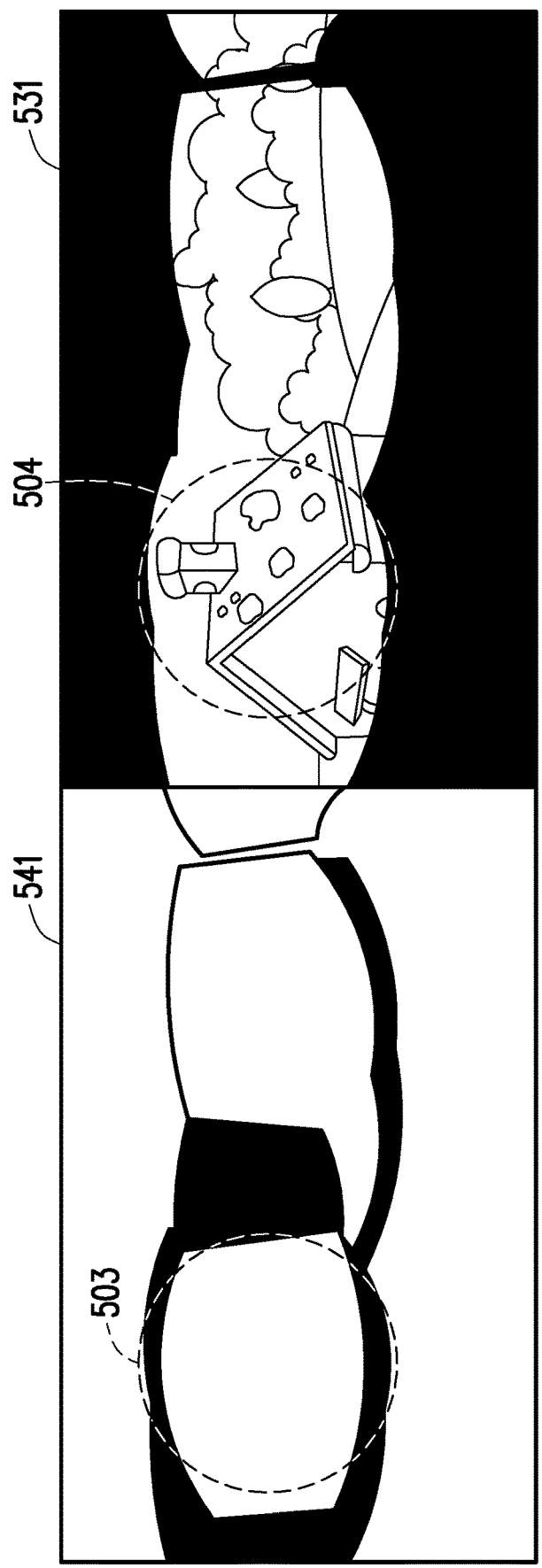

In addition to stitching the captured images by the calculating device 16 based on the above conditions, after the user walks back and forth multiple times in the space, the calculating device 16 can also update the panoramic image according the corresponding image with higher importance parameter. For instance, FIG. 5A and FIG. 5B are examples illustrating how a captured image is stitched to generate a panoramic image according to an embodiment of the invention. After the image capturing device 12 captures a plurality of captured images and the calculating device 16 generates importance frames corresponding to each of the captured images, the calculating device 16 can obtain, for example, an importance map 540 and a panoramic image 530 in FIG. 5A.

As can be seen from the panoramic image 530 and the importance map 540, an image included by a frame 502 in the panoramic image 530 corresponding to a frame 501 of the importance map 540 is being stitched by a captured image with lower resolution. Then, as the image capturing device 121 continues to capture more of the captured images, the calculating device 16 generates importance frames corresponding to each of the captured images. In the newly generated importance frame, if there are pixels with higher resolution corresponding to a portion in the panoramic image originally stitched by the captured image with lower resolution, the calculating device 16 updates the panoramic image according to the newly captured image with higher resolution. For instance, referring to FIG. 5B, a position of a frame 503 of an importance map 541 corresponds to a position of the frame 501 of the importance map 540 in FIG. 5A. Since the importance parameters corresponding to the captured image newly captured by the image capturing device 121 are higher than the importance parameters of the captured image originally used for stitching, the new importance parameters corresponding to the same pixels may be used to replace the original importance parameters. The calculating device 16 stitches the new captured image to the panoramic image according to the importance frame of the new captured image, so as to generate an updated panoramic image 531. Here, an image in a frame 504 (corresponding to the frame 503) of the panoramic image 531 has higher resolution than the original after the panoramic image is updated so the panoramic image can have a better quality.

The present application also provides an automated procedure such as an automatically-terminated stitching procedure. In this embodiment, the calculating device 16 integrates all the importance frames into the importance map, checks the importance parameters of all the pixels in the importance map, and ends an image stitching procedure when a proportion of the importance parameters set in the importance map is greater than a preset proportion ratio. That is to say, when the quality of the panoramic image reaches an acceptable quality, the stitching procedure is automatically terminated. For instance, if the calculating device 16 determines that the proportion of the importance parameters greater than a specific importance parameter (e.g., 0.8) is greater than the preset proportion threshold (e.g., 80%), the calculating device 16 terminates the stitching procedure early to save energy for the head-mounted display 12.

In the panoramic image generated by stitching the captured images using the stitching procedure provided by the present application, a portion that is not scanned by the head-mounted display 12 remains black, such as a black region of the panoramic image 531 in FIG. 5B. If the environment map is built by executing the building tool in advance in the conventional art, this black region does not affect the building procedure because the application is only accessed after the user continues to scan the images until the environment map is built. However, in the present application where the environment map is built in real time, if the black region exists in the panoramic image, a reflection and a real-time lighting of the virtual object will be affected when the environment map is actually applied. Therefore, in an embodiment of the invention, after the panoramic image is generated, the calculating device 16 further performs diffusion and blurring on the panoramic image, so as to build an environment map that can a better reflection of the real world.

Figure 6:
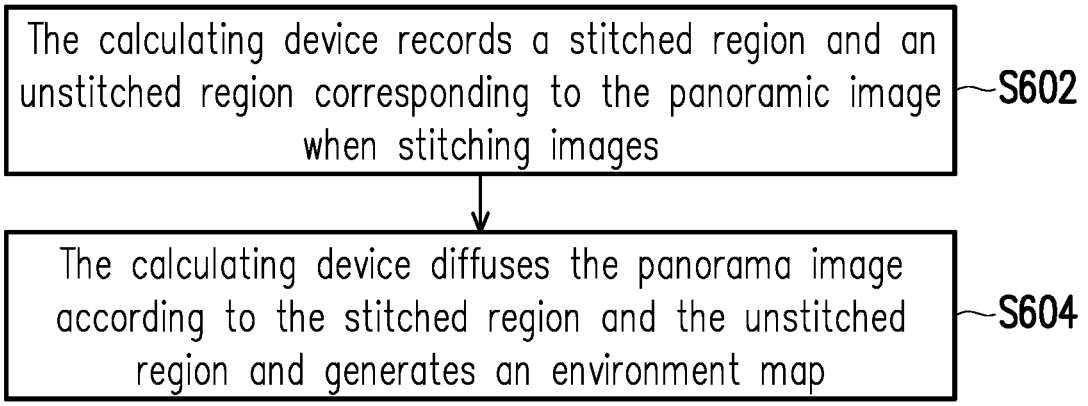
FIG. 6 is a flowchart illustrating a method for building environment map according to an embodiment of the invention.
Figure 7:
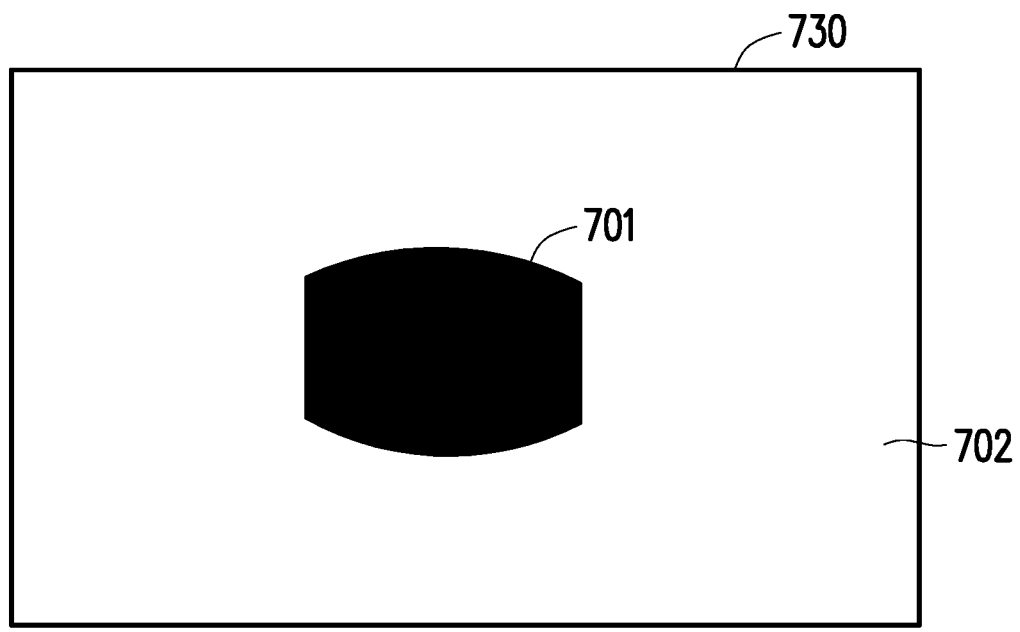
FIG. 7 is a schematic diagram illustrating an occupation map according to an embodiment of the invention.

FIG. 6 is a flowchart illustrating a method for building environment map according to an embodiment of the invention. Referring to FIG. 6, the calculating device 16 records a stitched region and an unstitched region corresponding to the panoramic image when stitching the captured images (step S602). Then, the calculating device 16 diffuses the panorama image according to the stitched region and the unstitched region and generates an environment map (step S604). Specifically, FIG. 7 is a schematic diagram illustrating an occupation map according to an embodiment of the invention. Referring to FIG. 7, when stitching the captured images, the calculating device 16 records occupation values of pixels of a stitched region 701 and pixels of an unstitched region 702, and generates an occupation map 730. In this embodiment, the occupation values of the pixels of the stitched region 701 are recorded, for example, as 1, and the occupation values of the pixels of the unstitched region 702 are recorded, for example, as 0. Next, according to the occupation map, the calculating device 16 diffuses the captured image corresponding to the stitched region to the unstitched region by using an image diffusion algorithm in the conventional art, so as to generate the environment map. For example, the calculating device 16 can detect a boundary of the stitched region 701, and diffuses pixels at the boundary by using an interpolation according to the pixels at the boundary and pixel values of the unstitched region. The invention does not limit the method for diffusing the image used herein.

Figure 8:
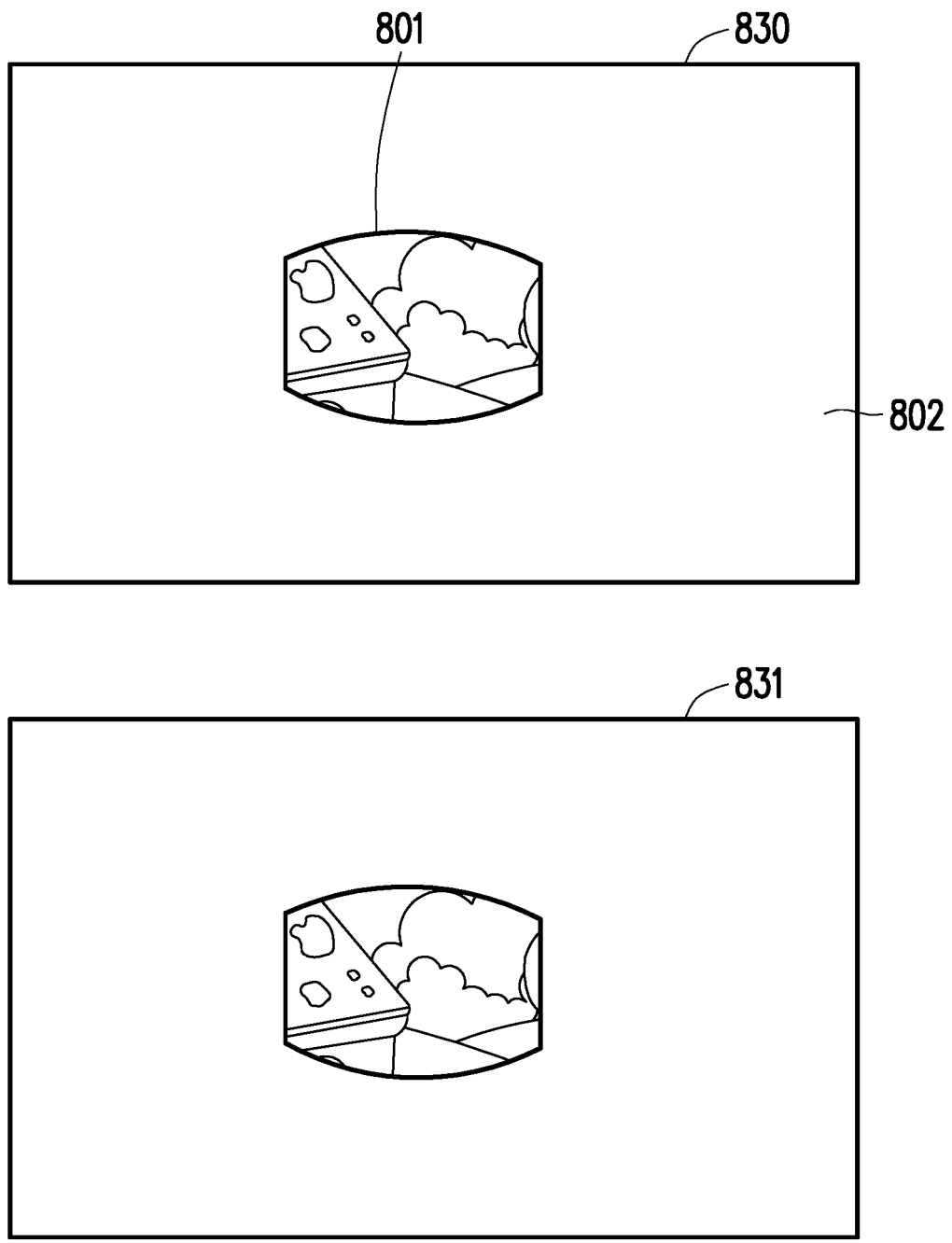
FIG. 8 illustrates an example for diffusing image according to an embodiment of the invention.
Figure 9:
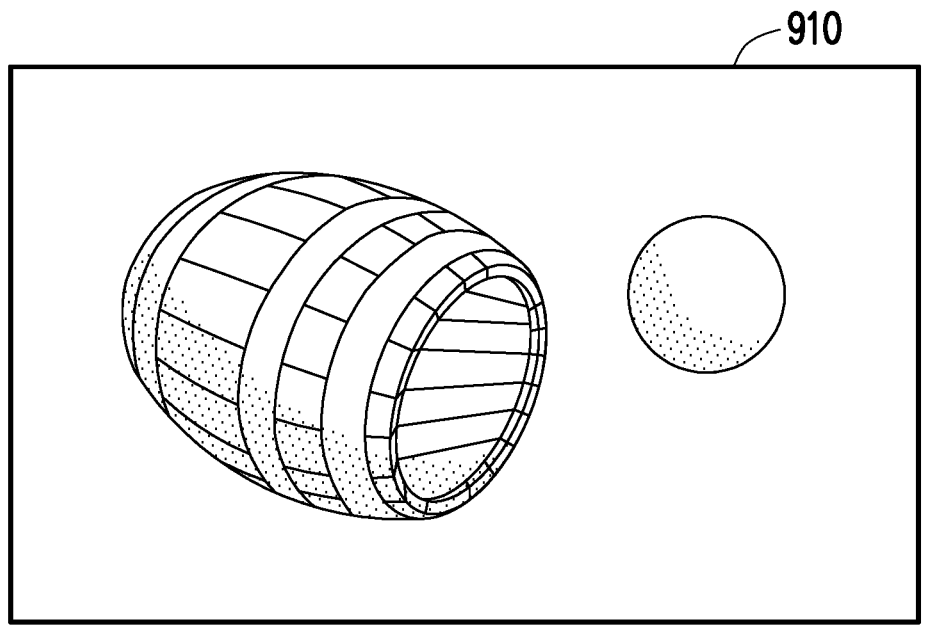
FIG. 9 illustrates an example for diffusing image according to an embodiment of the invention.
Figure 9:
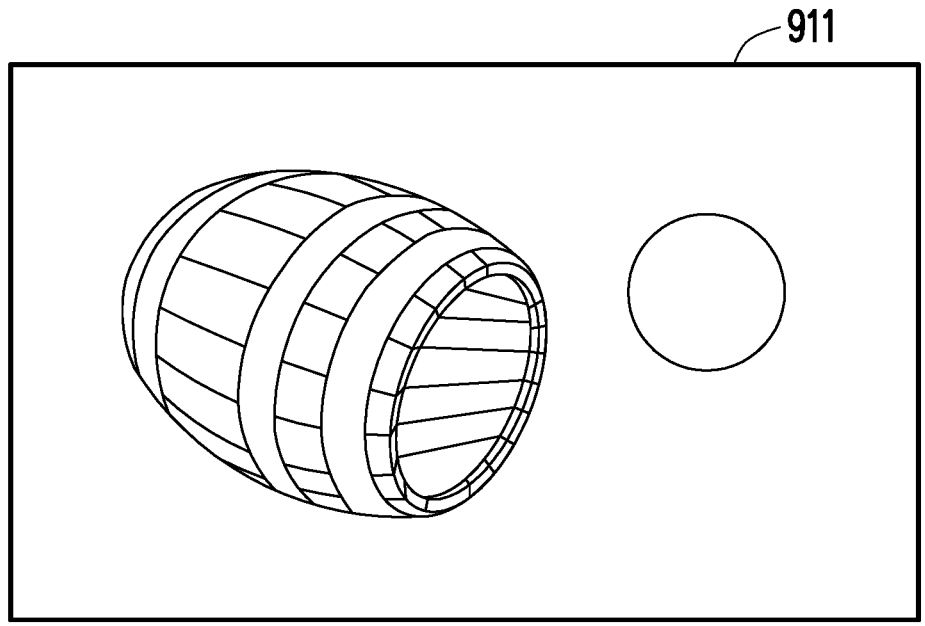

For instance, FIG. 8 illustrates an example for diffusing image according to an embodiment of the invention. Referring to FIG. 8, the calculating device 16 diffuses the captured image corresponding to a stitched region 801 to an unstitched region 802 to generate an environment map 830. After multiple diffusions are repeatedly performed, the calculating device 16 may diffuse the panoramic image into, for example, an environment map 831. In this embodiment of the invention, the environment map may be generated more directly and rapidly by directly performing a diffusion operation on the panoramic image. Further, through the diffusion operation, when the diffused image is used as the environment map to reflect the virtual object, the virtual object can obtain a better reflection corresponding to the real world. FIG. 9 illustrates an example for diffusing image according to an embodiment of the invention. Referring to FIG. 9, a wooden barrel in a frame 910 is reflected by using an environment map on which the diffusion operation is not performed, and a wooden barrel in frame 911 is reflected by using an environment map on which the diffusion operation is performed. Here, the wooden barrel in the frame 911 can obtain the reflection that better matches with that of the real world.

When the environment map is being generated, the environment map may be regarded as a plane map. When the generated environment map is to be used for an object reflection or other purposes, the environment map needs to be projected onto a three dimensional sphere through folding and pasting. In that case, if a seam at left and right ends of the environment map are not processed, a substantially discontinuous seam will be seen when the three dimensional sphere is used for reflection. Accordingly, when diffusing the panoramic image, the calculating device 16 will take fetched pixels for diffusing at left/right, and top/bottom seam positions into consideration. Specifically, when a pixel position for diffusing exceeds a boundary of the panoramic image, the calculating device 16 maps the pixel position to fetch a corresponding fetched pixel, and diffuses the panoramic image according to the fetched pixel.

Figure 10:
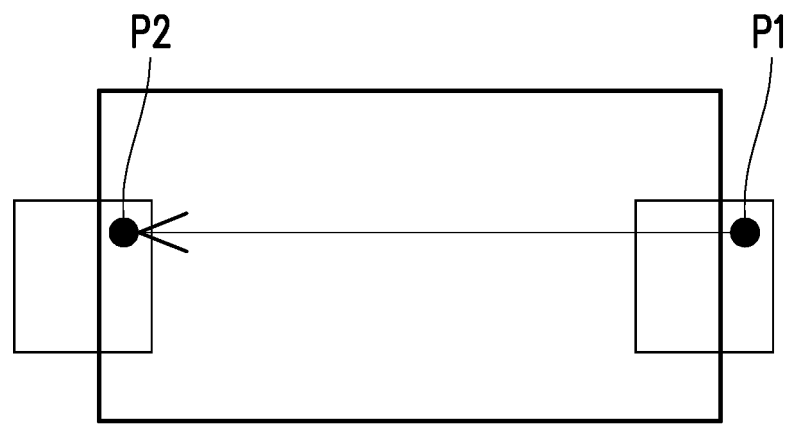
FIG. 10 is a schematic diagram illustrating a diffusion on a seam position according to an embodiment of the invention.
Figure 11:
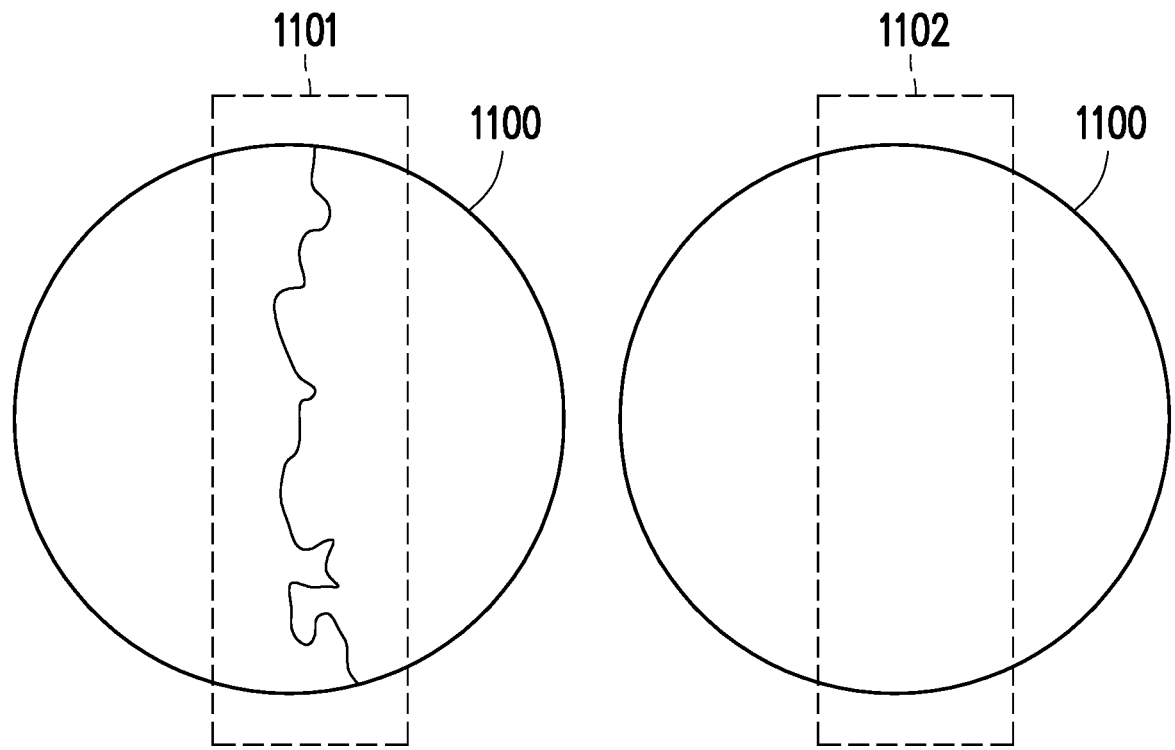
FIG. 11 is a schematic diagram of a seam position of a three dimensional object according to an embodiment of the invention.

With respect to the left/right seam position, FIG. 10 is a schematic diagram illustrating a diffusion on a seam position according to an embodiment of the invention. FIG. 11 is a schematic diagram of a seam position of a three dimensional object according to an embodiment of the invention. Referring to FIG. 11, a seam position generated after the calculating device 16 projects the environment map onto a three dimensional sphere 1100 is as shown by a portion included by a frame 1101. In order to solve the seam problem, referring to FIG. 10, if a fetched pixel P1 exceeding a right boundary is to be fetched during the diffusion, the calculating device 16 fetches a fetched pixel P2 of a corresponding position at a left boundary for the diffusion. The above method can smooth the seam position of the environment map, as shown by a portion included by a frame 1102 in FIG. 11.

Figure 12:
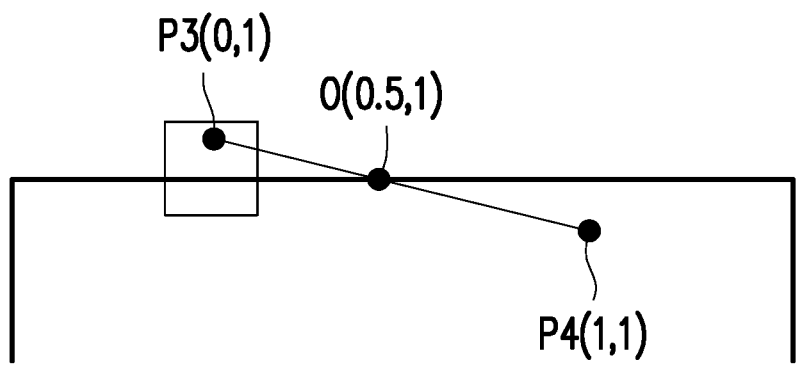
FIG. 12 is a schematic diagram illustrating a diffusion on a seam position according to an embodiment of the invention.
Figure 13:
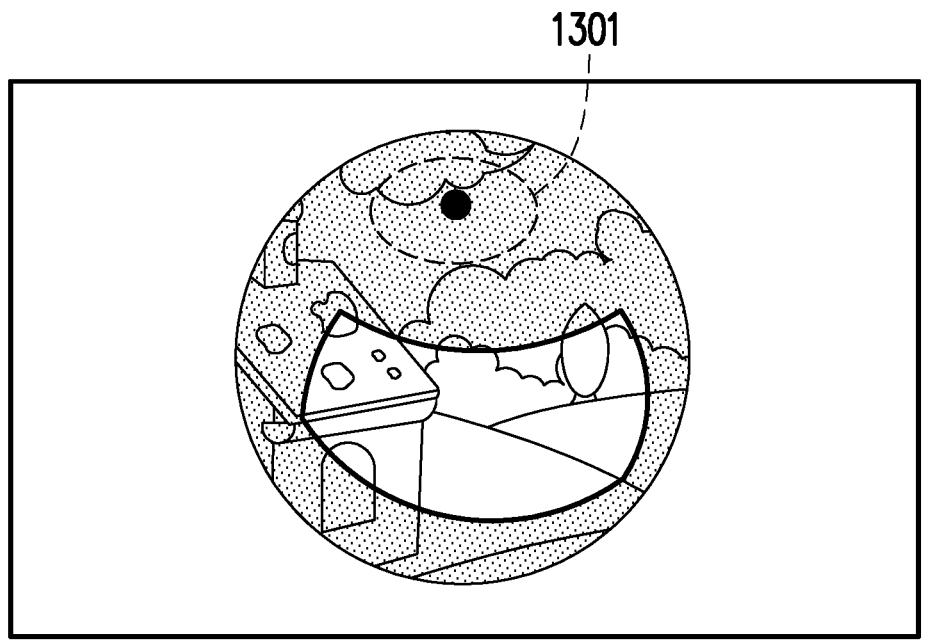
FIG. 13 is a schematic diagram of a seam position of a three dimensional object according to an embodiment of the invention.
Figure 13:
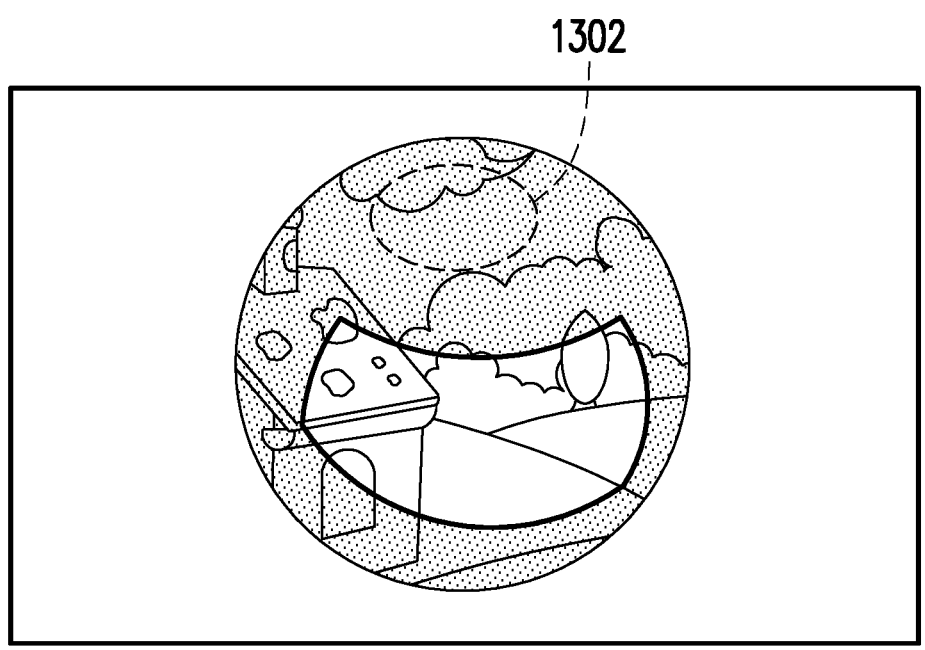

In addition, the above steps regulate the seam of the left and right boundaries. With respect to a pole, when the environment map is folded and projected onto the three dimensional sphere, the pole (actually just a point) should be blurred from all pixels at top and bottom boundaries of the image. For ease of calculation, the pole may be regarded as a mid point of the boundary. With respect to a pole position, FIG. 12 is a schematic diagram illustrating a diffusion on a seam position according to an embodiment of the invention. FIG. 13 is a schematic diagram of a seam position of a three dimensional object according to an embodiment of the invention. Referring to FIG. 12, a seam position generated after the calculating device 16 projects the environment map onto a three dimensional sphere is as shown by a portion included by a frame 1301. In order to solve the seam problem, referring to FIG. 12, if a fetched pixel P3 (0, 1) exceeding the top boundary is to be fetched during the diffusion, the calculating device 16 fetches a fetched pixel P4 (1, 1) of a corresponding position according to a mapping of a mid point O (0.5, 1) for the diffusion. The above method can smooth the pole of the environment map, as shown by a portion included by a frame 1302 in FIG. 13.

In summary, the method for building environment map and the mixed reality system provided by the invention can create the importance frames corresponding to the captured images according to the viewing direction and the translation direction of the head-mounted display, and build a panoramic environment map by stitching the captured images according to the importance frames. In addition, the image of the unstitched region may also be diffused in the built panoramic environment map. In this way, when the diffused image is used as the environment map to reflect the virtual object, the virtual object can obtain a better reflection corresponding to the real world. As a result, the environment map may be built in real time at online stage, so as to reduce the time required for executing the building tool before the user can access the mixed reality application.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:
1. A method for building environment map, comprising:
   capturing a plurality of captured images by a head-mounted display;
   calculating a viewing direction and a translation direction of the head-mounted display;

determining an importance parameter of each of pixels in the captured images according to an angle between the viewing direction and the translation direction of the head-mounted display;

creating importance frames corresponding to the captured images, wherein each of the importance frames comprises the importance parameters of the pixels corresponding to one of the captured images;

integrating the importance frames to generate an importance map corresponding to the captured images; and stitching the captured images to generate a panoramic image according to the importance map.

2. The method for building environment map according to claim 1, wherein the step of calculating the viewing direction and the translation direction of the head-mounted display comprises:

analyzing image content in the captured images to detect the viewing direction and the translation direction of the head-mounted display.

3. The method for building environment map according to claim 1, wherein the step of calculating the viewing direction and the translation direction of the head-mounted display comprises:

detecting the viewing direction of the head-mounted display worn by a user by a motion sensor, and locating the translation direction of the head-mounted display worn by the user by a locater.

4. The method for building environment map according to claim 1, wherein the step of stitching the captured images to generate the panoramic image according to the importance map comprises:

stitching the captured images to generate the panoramic image according to resolutions corresponding to the importance parameters in the importance frames.

5. The method for building environment map according to claim 1, the method further comprising:

ending an image stitching procedure when a proportion of the importance parameters set in the importance map is greater than a preset proportion threshold.

6. The method for building environment map according to claim 1, the method further comprising:

capturing a translation distance of the head-mounted display; and determining the importance map corresponding to the captured images according to the viewing direction, the translation direction and the translation distance of the head-mounted display.

7. The method for building environment map according to claim 1, the method further comprising:

recording a stitched region and an unstitched region corresponding to the panoramic image when stitching the captured images; and diffusing the panorama image according to the stitched region and the unstitched region and generating an environment map.

8. The method for building environment map according to claim 7, wherein the step of diffusing the panorama image according to the stitched region and the unstitched region and generating the environment map further comprises:

when a pixel position for diffusing exceeds a boundary of the panoramic image, mapping the pixel position to fetch a corresponding fetched pixel, and diffusing the panoramic image according to the fetched pixel.

9. A mixed reality system, comprising:
a head-mounted display;
a storage device, storing one or more commands; and
a calculating device, connected to the head-mounted display and the storage device, and configured to execute the one or more commands to:
capture a plurality of captured images by the head-mounted display;
calculate a viewing direction and a translation direction of the head-mounted display;
determine an importance parameter of each of pixels in the captured images according to an angle between the viewing direction and the translation direction of the head-mounted display;
create importance frames corresponding to the captured images, wherein each of the importance frames comprises the importance parameters of the pixels corresponding to one of the captured images;
integrate the importance frames to generate an importance map corresponding to the captured images; and
stitch the captured images to generate a panoramic image according to the importance map.

10. The mixed reality system according to claim 9, wherein the calculating device is further configured to analyze image content in the captured images to detect the viewing direction and the translation direction of the head-mounted display.

11. The mixed reality system according to claim 9, further comprising:

a motion sensor, connected to the calculating device,
wherein the calculating device detects the viewing direction of the head-mounted display worn by a user by the motion sensor.

12. The mixed reality system according to claim 9, further comprising:

a locater, locating a user wearing the head-mounted display,
wherein the calculating device locates the translation direction of the head-mounted display worn by the user by the locater.

13. The mixed reality system according to claim 9, wherein the calculating device is further configured to stitch the captured images to generate the panoramic image according to resolutions corresponding to the importance parameters in the importance frames.

14. The mixed reality system according to claim 9, wherein the calculating device is further configured to end an image stitching procedure when a proportion of the importance parameters set in the importance map is greater than a preset proportion threshold.

15. The mixed reality system according to claim 9, wherein the calculating device is further configured to capture a translation distance of the head-mounted display, and determine the importance map corresponding to the captured images according to the viewing direction, the translation direction and the translation distance of the head-mounted display.

16. The mixed reality system according to claim 9, wherein the calculating device is further configured to record a stitched region and an unstitched region corresponding to the panoramic image when stitching the captured images, diffuse the panorama image according to the stitched region and the unstitched region and generate an environment map.

17. The mixed reality system according to claim 16, wherein when a pixel position for diffusing exceeds a boundary of the panoramic image, the calculating device is further configured to map the pixel position to fetch a corresponding fetched pixel, and diffuse the panoramic image according to the fetched pixel.

18. A non-transitory computer-readable recording medium for recording programs, wherein the programs are loaded in by a processor in a calculating device to execute steps of:

capturing a plurality of captured images by a head-mounted display;

calculating a viewing direction and a translation direction of the head-mounted display;

determining an importance parameter of each of pixels in the captured images according to an angle between the viewing direction and the translation direction of the head-mounted display;

creating importance frames corresponding to the captured images, wherein each of the importance frames comprises the importance parameters of the pixels corresponding to one of the captured images;

integrating the importance frames to generate an importance map corresponding to the captured images; and stitching the captured images to generate a panoramic image according to the importance map.

* * * * *